US012663653B2

(12) United States Patent
Raij et al.

(10) Patent No.: US 12,663,653 B2
(45) Date of Patent: \*Jun. 23, 2026

(54) INTERFACE DEVICE WITH THREE-DIMENSIONAL (3-D) VIEWING FUNCTIONALITY

(71) Applicant: Universal City Studios LLC, Universal City, CA (US)

(72) Inventors: Andrew Raij, Orlando, FL (US); Gregory Addison Hill, Jr., Santa Clarita, CA (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/470,828

(22) Filed: Sep. 20, 2023

(65) Prior Publication Data

US 2024/0012260 A1 Jan. 11, 2024

Related U.S. Application Data

(63) Continuation of application No. 17/335,877, filed on Jun. 1, 2021, now Pat. No. 11,774,770.

(Continued)

(51) Int. Cl.
*G02B 27/01* (2006.01)
*G02B 30/23* (2020.01)
(Continued)

(52) U.S. Cl.
CPC ..... *G02B 27/0176* (2013.01); *G02B 27/0172* (2013.01); *G02B 30/23* (2020.01);
(Continued)

(58) Field of Classification Search
CPC .............. G02B 27/017; G02B 27/0172; G02B 27/0176; G02B 30/23; G02B 30/24;
(Continued)

(56) References Cited

U.S. PATENT DOCUMENTS

| 8,467,133 | B2 | 6/2013 | Miller | |
| 10,151,927 | B2 * | 12/2018 | Magpuri | ................ A63G 31/16 |

(Continued)

FOREIGN PATENT DOCUMENTS

| JP | H07250291 A | 9/1995 |
| JP | 2017511041 A | 4/2017 |

(Continued)

OTHER PUBLICATIONS

PCT/US2021/035333 International Search Report and Written Opinion mailed Aug. 31, 2021.

(Continued)

*Primary Examiner* — Cory A Almeida
(74) *Attorney, Agent, or Firm* — Fletcher Yoder, P.C.

(57) ABSTRACT

An interface device is provided that is configured to allow viewing of three-dimensional (3-D) content when the interface device is worn. In certain embodiments, a wearable visualization device can be removably coupled to the interface device. The wearable visualization device, when in use, may provide additional viewing functionality, such as facilitating the viewing of augmented reality (AR) or virtual reality (VR).

20 Claims, 7 Drawing Sheets

Related U.S. Application Data

(60) Provisional application No. 63/034,193, filed on Jun. 3, 2020.

(51) Int. Cl.

| | |
|---|---|
| *G02B 30/24* | (2020.01) |
| *G02B 30/25* | (2020.01) |
| *G06F 1/16* | (2006.01) |

(52) U.S. Cl.
CPC ............. *G02B 30/24* (2020.01); *G02B 30/25* (2020.01); *G06F 1/163* (2013.01); *G02B 2027/0134* (2013.01); *G02B 2027/0156* (2013.01); *G02B 2027/0169* (2013.01); *G02B 2027/0178* (2013.01)

(58) Field of Classification Search
CPC ........... G02B 30/25; G02B 2027/0134; G02B 2027/0156; G02B 2027/0169; G02B 2027/0178; G06F 1/163
See application file for complete search history.

(56) References Cited

U.S. PATENT DOCUMENTS

| | | | |
|---|---|---|---|
| 10,514,542 | B2 | 12/2019 | Erinjippurath et al. |
| 10,656,704 | B2 | 5/2020 | Schwartz et al. |
| 11,200,655 | B2 | 12/2021 | Goergen et al. |
| 11,200,656 | B2 | 12/2021 | Goergen et al. |
| 11,210,772 | B2 | 12/2021 | Goergen et al. |
| 2007/0279318 | A1 | 12/2007 | Yamamoto |
| 2009/0040296 | A1* | 2/2009 | Moscato ........... G02B 27/0176 348/E13.001 |
| 2012/0326948 | A1* | 12/2012 | Crocco .................... G09G 5/00 359/630 |
| 2013/0300766 | A1* | 11/2013 | Mukawa ........... G02B 27/0179 345/633 |
| 2014/0085190 | A1 | 3/2014 | Erinjippurath et al. |
| 2015/0002374 | A1* | 1/2015 | Erinjippurath .......... G06T 15/08 345/8 |
| 2016/0011424 | A1* | 1/2016 | Thurber ............. G02B 27/0176 345/8 |
| 2016/0238850 | A1 | 8/2016 | Yang |
| 2016/0353098 | A1 | 12/2016 | Stein |
| 2017/0094816 | A1 | 3/2017 | Yun et al. |
| 2017/0139212 | A1 | 5/2017 | Choi |
| 2017/0323482 | A1 | 11/2017 | Coup et al. |
| 2018/0255285 | A1 | 9/2018 | Hall et al. |
| 2019/0041899 | A1 | 2/2019 | Ellis et al. |
| 2019/0240569 | A1* | 8/2019 | Kuwatani ............... G06F 3/012 |
| 2019/0377192 | A1 | 12/2019 | Ng-Thow-Hing |
| 2020/0026088 | A1* | 1/2020 | Tzvieli .................. B60R 21/214 |
| 2020/0105061 | A1* | 4/2020 | Goergen ............... G02B 30/25 |
| 2021/0216099 | A1 | 7/2021 | Goodner et al. |
| 2021/0373346 | A1 | 12/2021 | Ninan et al. |

FOREIGN PATENT DOCUMENTS

| | | |
|---|---|---|
| KR | 101606854 B1 | 3/2016 |
| WO | 2014068482 A1 | 5/2014 |

OTHER PUBLICATIONS

JP Office Action for Japanese Application No. 2022-574567 mailed Mar. 31, 2025.
IN Office Action for Indian Application No. 202217076895 mailed Feb. 10, 2026.

* cited by examiner

| | |
|---|---|
| 3-D IMAGES | 36 |
| REAL-WORLD ENVIRONMENT | 30 |
| VIRTUAL FEATURES | 32 |
| SURREAL ENVIRONMENT | 40 |

INTERFACE DEVICE WITH THREE-DIMENSIONAL (3-D) VIEWING FUNCTIONALITY

CROSS-REFERENCE TO RELATED APPLICATIONS

This is a continuation application of U.S. patent application Ser. No. 17/335,877, entitled "INTERFACE DEVICE WITH THREE-DIMENSIONAL (3-D) VIEWING FUNC-TIONALITY," filed Jun. 1, 2021, which claims priority from and the benefit of U.S. Provisional Application No. 63/034, 193, entitled "INTERFACE DEVICE WITH THREE-DI-MENSIONAL (3-D) VIEWING FUNCTIONALITY," filed Jun. 3, 2020, each of which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclo-sure. Accordingly, it should be understood that these state-ments are to be read in this light, and not as admissions of prior art.

Amusement parks and/or theme parks may include vari-ous entertainment attractions, restaurants, and rides useful in providing enjoyment to guests. Areas of an amusement park may have different themes that are specifically targeted to certain audiences. For example, certain areas may include themes that are traditionally of interest to children, while other areas may include themes that are traditionally of interest to more mature audiences. Generally, such areas having themes may be referred to as an attraction or a themed attraction. It is recognized that it may be desirable to enhance the immersive experience for guests of such attrac-tions, such as by augmenting the themes with virtual features as well as with stereoscopic imagery, which generates the illusion of three-dimensional (3-D) imagery.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an interface device for a wearable visualization device includes a head strap assembly, config-ured to be worn on a head of a guest when in use to secure the interface device to the head, and an interface frame coupled to the head strap assembly. The interface device also includes a three-dimensional (3-D) viewing component attached to the interface frame and configured to allow viewing of one or more coded 2-dimensional (2-D) images as one or more deciphered 3-D features. The interface device also includes an attachment mechanism configured to removably couple the separate wearable visualization device to the interface frame. The wearable visualization device comprises one or more displays for displaying virtual fea-tures when in use.

In one embodiment, a combined three-dimensional (3-D) and augmented reality viewing system includes an interface device configured to be worn on a head of a guest when in use. The interface device includes an interface frame and a 3-D viewing component attached to the interface frame. The 3-D viewing component is configured to allow viewing of projected or displayed 3-D images. The interface device also includes a first attachment mechanism configured to remov-ably couple a separate wearable visualization device to the interface frame. The viewing system also includes the wear-able visualization device, which includes one or more trans-parent or semi-transparent displays on which one or more virtual features are displayed when in use. The wearable visualization device also includes a second attachment mechanism configured to removably engage the first attach-ment mechanism.

In one embodiment, a combined three-dimensional (3-D) and virtual reality viewing system includes an interface device configured to be worn on a head of a guest when in use. The interface device includes an interface frame and a 3-D viewing component attached to the interface frame. The 3-D viewing component is configured to allow viewing of projected or displayed 3-D images. The interface device also includes a first attachment mechanism configured to remov-ably couple a separate wearable visualization device to the interface frame. The viewing system also includes the wear-able visualization device, which includes one or more opaque displays on which one or more virtual features are displayed when in use. The wearable visualization device also includes a second attachment mechanism configured to removably engage the first attachment mechanism.

Various refinements of the features noted above may be undertaken in relation to various aspects of the present disclosure. Further features may also be incorporated in these various aspects as well. These refinements and addi-tional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
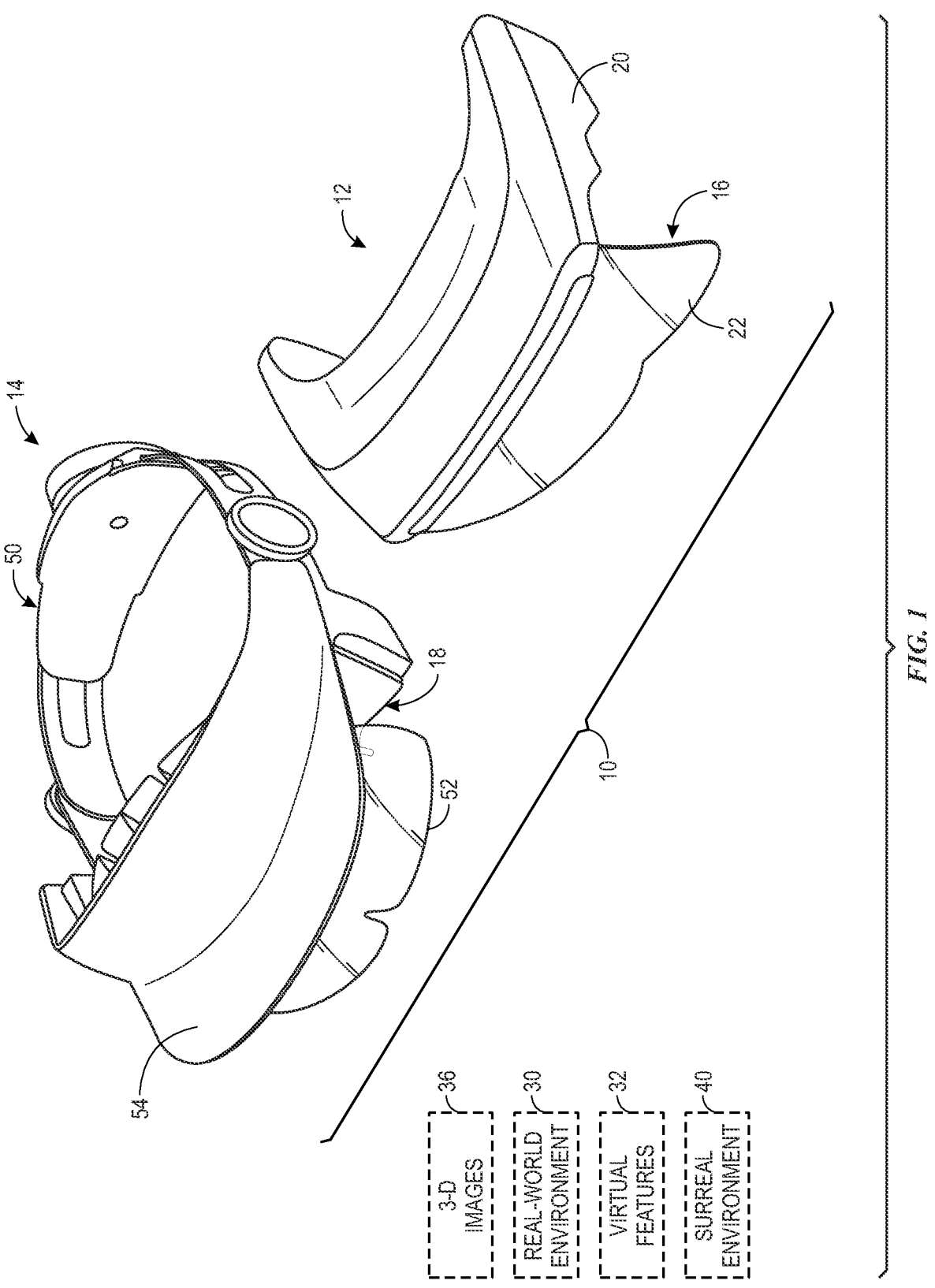
FIG. 1 is a perspective view of an embodiment of a guest interface device and a wearable visualization device in a detached configuration, in accordance with present embodi-ments.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

An amusement park may include an augmented reality (AR), a virtual reality (VR), and/or a mixed reality (combination of AR and VR) system (AR/VR system) that is configured to enhance a guest experience of an amusement park attraction by providing guests with AR/VR experiences (e.g., AR experiences, VR experiences, or both). Indeed, combinations of certain hardware configurations, software configurations (e.g., algorithmic structures and/or modeled responses), as well as certain attraction features may be utilized to provide guests with AR/VR experiences that may be customizable, personalized, and/or interactive.

In certain contexts, such attraction features may also include aspects which may incorporate three-dimensional (3-D) content, distinct from the AR and/or VR content, using suitable stereoscopic techniques. With this in mind, reference herein to 3-D techniques or imagery includes any suitable stereoscopic techniques to provide a stereoscopic 3-D effect that enables a guest to perceive depth from two-dimensional (2-D), slightly offset images, or 2-D coded images, which are presented to each eye of the guest. The 3-D features are visualized from an electronic display device or a projector screen via light-filtering coatings or elements that enable each eye of the guest to receive two different images of a same object, which are optically combined into a discernable or deciphered 3-D appearance.

As may be appreciated, such stereoscopic techniques typically employ lenses or glasses worn by a guest to help perceive the 3-D content. However, with the integration of head wearable technologies for certain attractions or ride vehicles within theme park environments, it becomes difficult or unrealistic for guests to simultaneously wear traditional 3-D glasses to perceive 3-D content displayed or projected within the theme park environments in conjunction with the a headset or glasses typically associated with the display of VR or AR content, respectively. With this in mind, embodiments of the present disclosure relate to a wearable visualization device assembly or viewing system having a multi-piece housing, one portion of which facilitates viewing 3-D content and a second portion of which facilitates viewing VR or AR content generated for the respective attraction.

With the preceding in mind, FIG. 1 is a perspective view an embodiment of one such multi-piece device in the form of a combined or an enhanced viewing system 10 configured to enable a guest (e.g., a user, an amusement park employee, a ride vehicle passenger) to experience (e.g., view, interact with) AR/VR scenes, as well as stereoscopic 3-D imagery that is projected and/or displayed on a screen. The enhanced viewing system 10 includes a wearable visualization device 12 that provided the AR/VR viewing functionality and a guest interface device 14 (e.g., interface device) that provides the 3-D viewing functionality. As discussed below, the wearable visualization device 12 and the guest interface device 14 are removably coupleable to one another to allow a guest to switch between the different viewing functionalities, as appropriate.

With respect to FIG. 1, the guest interface device 14 is configured to be affixed to the guest's head and, thus, enable the guest to comfortably wear the wearable visualization device 12 throughout various attractions or while traversing certain amusement park environments. For example, the guest interface device 14 may include a head strap assembly 50 that is configured to attach to an interface frame 18 portion. In combination, the presently illustrated interface frame 18 and head strap assembly 50 span a circumference of the guest's head. The head strap assembly 50 is configured to be tightened (e.g., constricted) on the guest's head. In this manner, the head strap assembly 50 facilitates affixing the guest interface device 14 to the head of the guest, such that the guest interface device 14 may be utilized to retain the wearable visualization device 12 on the guest (e.g., when the wearable visualization device 12 is in the engaged or attached configuration, as discussed below). However, the head strap assembly 50 may be any suitable assembly that facilitates retention of the wearable visualization device 12 on the guest. As discussed herein, the guest interface device 14 enables the guest to efficiently couple and decouple the wearable visualization device 12 from the guest interface device 14, such as without detachment of the guest interface device 14 from the guest's head.

As presently recognized, the guest interface device 14 employs one or more suitable 3-D technologies to enable the guest to perceive the 3-D features, without depending on the separate wearable visualization device 12. Examples of such 3-D viewing technologies may include a 3-D viewing component that enables the guest to perceive one or more coded 2-dimensional (2-D) images as one or more deciphered 3-D features. For example, the 3-D viewing component may be embodied as lenses 52 that may be provided on or attached to the guest interface device 14. In such embodiments, the lenses 52 may be formed as part of or may be separably attached to the interface frame 18, which is provided as part of the guest interface device 14 and configured to attach to or receive the lenses 52. The lenses 52 may be or may incorporate a passive 3-D lens assembly, coating, or filter (e.g., anaglyph filters, polarization filters, etc.) or an active 3-D lens assembly, coating, or filter (e.g., active shuttering lens assembly, which may employ liquid crystal layers).

By way of example, the lenses 52 of the guest interface device 14 may include a first filter provided as or on one lens of the lenses 52 and a second filter provided as or on the other lens, where each filter has different optical properties or qualities. In combination, these optical properties allow a guest to view 3-D images 36. For instance, in some embodiments, the lenses 52 are a light-filtering lens assembly or 3-D filtering layer that includes a first anaglyph lens or filter (e.g., blue film) as a first lens and a second anaglyph lens or filter (e.g., red film) for the second lens. In other embodiments, the lenses 52 are a light-filtering lens assembly or 3-D filtering layer that includes a first polarized lens having a first polarization (e.g., clockwise, vertical) as a first lens and a second polarized lens having a second, opposite polarization (e.g., counter-clockwise, horizontal) as the second lens. The lenses 52 of these embodiments therefore utilize wavelength filtering or polarization filtering to condition the 3-D images 36 for viewing by the guest. In further embodiments, the lenses 52 are active shuttering lenses having a first liquid crystal layer and a second liquid crystal layer, where the application of power to the lenses 52 causes one layer to be opaque and the other layer to be translucent. In any case, when the guest is wearing the guest interface device 14, the lenses 52 provide a first perspective or portion of the 3-D images 36 to one eye of the guest and a second, offset perspective or portion of the 3-D images 36 to the other eye of the guest. The relatively offset images provide a perception of depth to the guest, who visualizes the 3-D images 36 at a specified focal length that varies based on a magnitude of the offset between the offset images.

The lenses 52 may also include an anti-glare coating or filter disposed adjacent to or on an environment-facing surface of the lenses 52. The anti-glare coating may be any suitable semi-opaque or light-blocking material that reduces the transmission of light from strong light sources through the lenses 52 that would otherwise obscure the virtual features 32 and the 3-D images 36. In other embodiments, the anti-glare coating is omitted and/or a hat brim 54 is provided as part of the guest interface device 14 to reduce glare onto the lenses 52. Moreover, it is to be understood that the coatings of the lenses 52 may be disposed in any suitable order relative to one another, provided that the lenses 52 are sufficiently transparent to the light from a 3-D display system, discussed herein, to enable the guest to properly visualize the 3-D images 36 and to enable the guest to properly visualize the virtual features 32.

With respect to the viewing of virtual features 32, these features may be viewed by a guest using the wearable visualization device 12, which can be removably coupled to the guest interface device 14. By way of a first implementation, and with respect to FIG. 1, an augmented reality (AR) approach will be described first. However, as discussed elsewhere herein, in other contexts the wearable visualization device 12 may be configured for viewing virtual reality (VR) content (e.g., the wearable visualization device 12 may be a VR headset) which, when coupled to the guest interface device 14, allows a guest to see and/or interact with virtual features 32, typically without the context of the real-world environment 30.

With this above introduction in mind, an example embodiment suitable for viewing AR content is depicted in FIG. 1. In this and other embodiments, the wearable visualization device 12 may include or incorporate an electronics package suitable for presenting AR and/or VR content when coupled to the guest interface device 14. For example, the wearable visualization device 12 may include electronic eyeglasses 16 through which a wearer may simultaneously view the AR content (e.g., virtual features 32) displayed on the electronic eyeglasses 16 superimposed on the real world environment 30. Lenses or optical features of the wearable visualization device 12 may be polarized to match (or otherwise optically correspond to) any polarization of the lenses 52 of the guest interface device 14 to allow sufficient or maximal light transmission through the combined optics. Indeed, adjusting the optical features of the wearable visualization device 12 to further integrate with the lenses 52 of the guest interface device 14 may provide enhanced or more realistic viewing of 3-D content.

The electronic eyeglasses 16 in such an AR context may include one or more displays 22 (e.g., transparent, semi-transparent, and so forth) onto which certain virtual features 32 may be displayed or overlaid. By way of non-limiting example, the displays 20 may include transparent (e.g., see-through) light emitting diode (LED) displays or transparent (e.g., see-through) organic light emitting diode (OLED) displays. That is, the electronic eyeglasses 16 may at least partially control a view of the guest by overlaying the virtual features 32 onto a line of sight of the guest. To this end, the wearable visualization device 12 may enable the guest to visualize and perceive a surreal environment 40 having certain virtual features 32 (e.g., AR features) overlaid onto the physical, real-world environment 30 (e.g., physical structures in the attraction) viewable by the guest through the displays 22. Moreover, the electronic eyeglasses 16 may operate at an increased brightness level compared to a brightness level of electronic eyeglasses that do not integrate with the lenses 52, thereby enabling perception of the of the virtual features 32 through the lenses 52 despite potential dimness attributed by polarized or other embodiments of the lenses 52

As noted herein, in certain embodiments the guest interface device 14 includes lenses 52 or other suitable viewing structures (e.g., polarized lenses or other lenses suitable for allowing stereoscopic viewing) that allow a guest wearing the guest interface device 14 to view 3-D images 36 when the wearable visualization device 12 is removed or, in an AR context, when the wearable visualization device 12 is coupled to the guest interface device 14. By way of example of the latter, AR context (illustrated in FIG. 1), the AR functionality provided by the electronic eyeglasses 16 may be performed on or otherwise leverage the 3-D images 36 viewable using the guest interface device 14 to allow the augmented reality content (i.e., virtual features 32) displayed on the electronic eyeglasses 16 to be perceived as being associated with different depths or focal planes (e.g., multiple, independent focal planes) associated with the 3-D images 36.

Though the preceding example relates primarily to AR implementations, as noted above, the wearable visualization device 12 may instead be used for viewing VR content. By way of example in such a VR context, the wearable visualization device 12 may be a VR headset that control or limits the view of the guest (e.g., using opaque viewing surfaces), such as opaque or non-transparent displays configured to display virtual features 32 (e.g., VR features) to the guest. As such, the surreal environment 40 viewable by the guest may be, for example, a real-time video that includes real-world images of the physical, real-world environment 30 electronically merged with one or more virtual features 32. Thus, in wearing the wearable visualization device 12 in a VR context, the guest may feel completely encompassed by the surreal environment 40 and may perceive the surreal environment 40 to be the real-world environment 30 that includes certain virtual features 32.

With the preceding in mind, it should be appreciated that the surreal environment 40 may include an AR experience, a VR experience, a mixed reality experience, a computer-mediated reality experience, a combination thereof, or another suitable surreal environment. Moreover, it should be understood that the wearable visualization device 12 may be used alone or in combination with the 3-D content viewable using the guest interface device 14 to create the surreal environment 40. Indeed, the guest may wear the guest interface device 14, with or without the wearable visualization device 12 attached, throughout all or part of a duration of a ride of an amusement park ride or during another time, such as during a game, throughout a particular area or attraction of an amusement park, during a ride to a hotel associated with the amusement park, at the hotel, and so forth. In some embodiments, when implemented in the amusement park setting, the wearable visualization device 12 may be physically coupled to (e.g., tethered via a cable) to a structure (e.g., a ride vehicle of the amusement park ride) to block separation of the wearable visualization device 12 from the structure and/or may be electronically coupled to (e.g., via the cable) a computing system (e.g., a computer graphics generation system) to facilitate operation of the wearable visualization device 12 (e.g., display of the virtual features 32).

Figure 2:
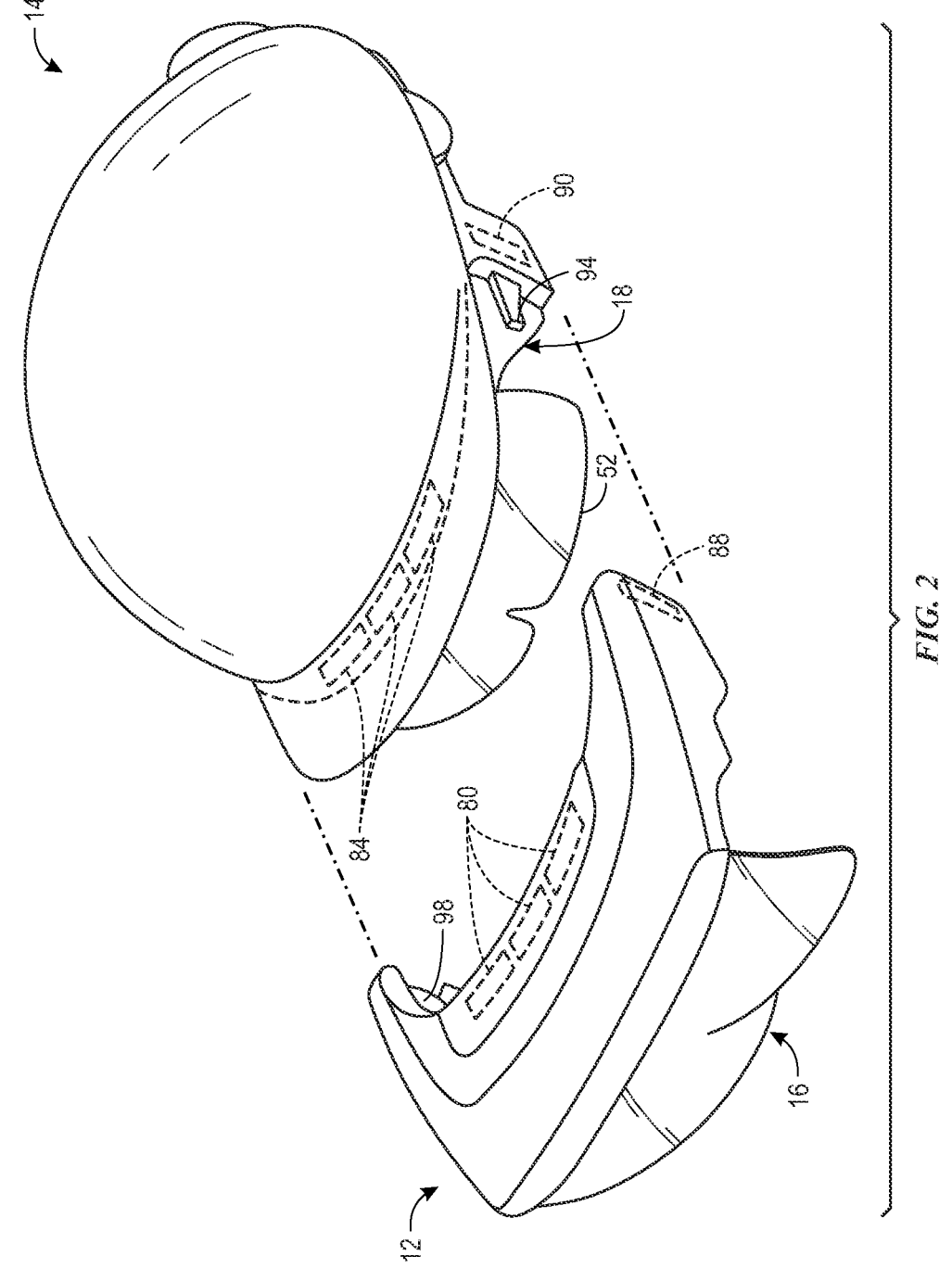
FIG. 2 is a perspective view of another embodiment of a guest interface device and a wearable visualization device in a detached configuration, in accordance with present embodiments.
Figure 3:
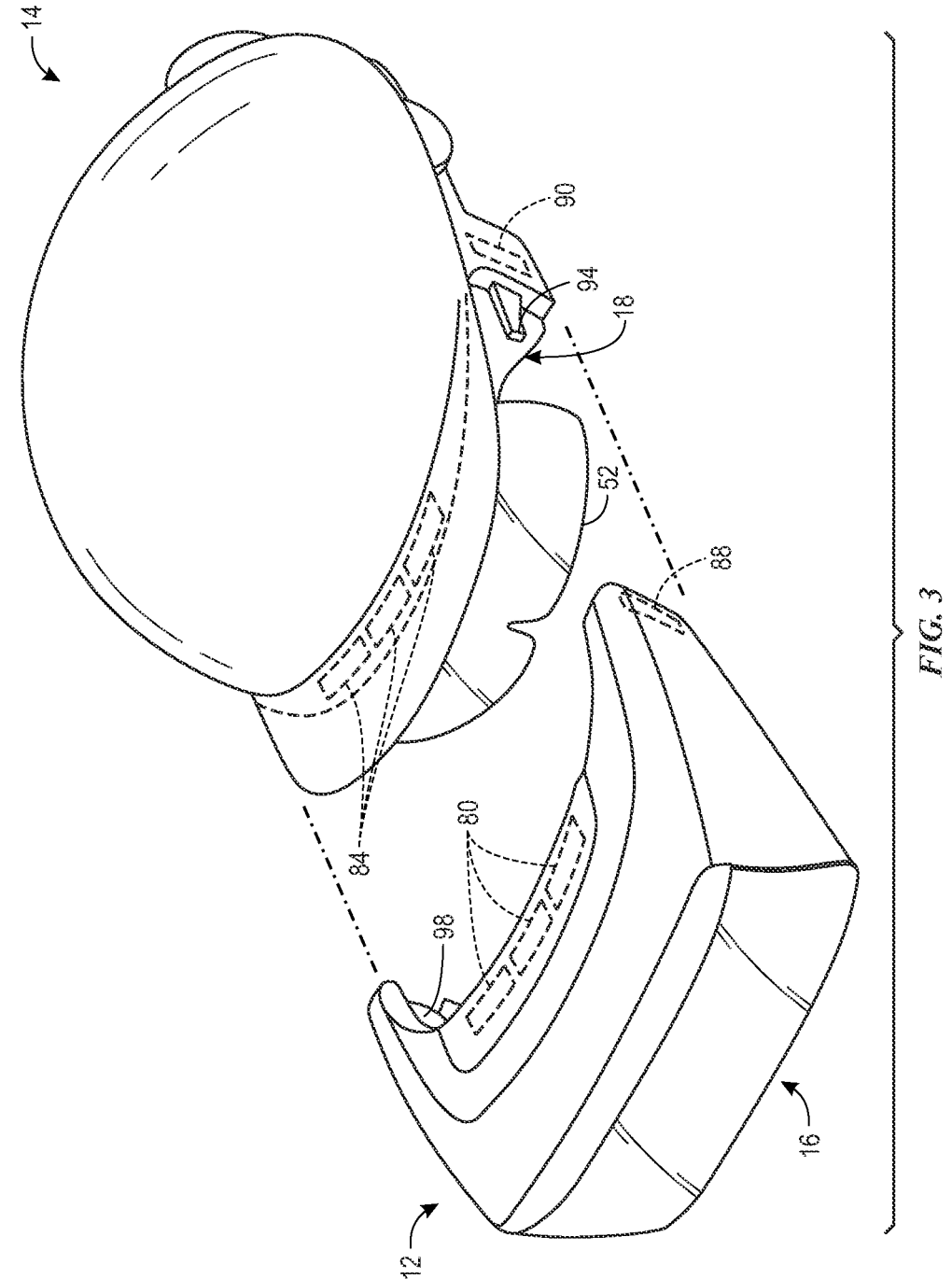
FIG. 3 is a perspective view of another embodiment of a guest interface device and a wearable visualization device in a detached configuration, in accordance with present embodiments.

As discussed herein, the wearable visualization device 12 is removably coupleable (e.g., toollessly coupleable; coupleable without tools; coupled without threaded fasteners, such as bolts; separable without tools and without breaking the components of the wearable visualization device 12 or the guest interface device 14) to the guest interface device 14 (such as to the interface frame 18) to enable the wearable visualization device 12 to quickly transition between an engaged configuration, in which the wearable visualization device 12 is coupled to the guest interface device 14, and a disengaged or detached configuration. FIGS. 2 and 3, discussed below illustrate the transition between the engaged and disengaged configurations. Turning to FIGS. 2 and 3, these figures are perspective views of embodiments of the wearable visualization device 12 and the guest interface device 14 and will be discussed concurrently below. Furthermore, it should be noted that FIGS. 2 and 3 illustrate a different structure for the guest interface device 14 (e.g., a helmet, compared to a visor of FIG. 1), as various different structures for the guest interface device 14 are envisioned herein. Further, FIG. 3 illustrates a different structure for the wearable visualization device 12 (e.g., a VR headset, compared to electronic eyeglasses 16 of FIGS. 1 and 2), as both AR and VR embodiments of the wearable visualization device 12 are envisioned herein. In practice, it should be appreciated that any combination of these embodiments (e.g., visor and electronic eyeglasses, helmet and electronic eyeglasses, visor and VR headset, helmet and VR headset, and so forth) may be practiced, and the present examples are not intended to be limiting, but are instead intended to provide select, meaningful, and illustrative real-world examples for the purpose of explanation.

With this in mind, and turning to FIGS. 2 and 3, in these examples the wearable visualization device 12 may include one or more primary magnets 80 positioned on or in the wearable visualization device 12. The one or more primary magnets 80 may be positioned or configured to interface with (e.g., magnetically attach) corresponding primary magnets 84 positioned on or in the guest interface device 14, such as within the interface frame 18. In this manner, when the wearable visualization device 12 is brought into proximity to the guest interface device 14, the primary magnets 80, 84 may magnetically couple to one another.

In the depicted example, the wearable visualization device 12 is also shown as including one or more secondary magnets 88 positioned on or in a side or peripheral portion of the wearable visualization device 12. The one or more secondary magnets 88 may be positioned or configured to interface with (e.g., magnetically attach) corresponding secondary magnets 90 positioned on or in corresponding side locations of the guest interface device 14, such as respective portions of the interface frame 18. The secondary magnets 88, 90 may be provided in addition to or in the alternative of the primary magnets 80, 84 and perform similarly. That is, the secondary magnets 88, 90 may magnetically couple to one another when brought in proximity.

With the preceding in mind, to couple the wearable visualization device 12 to the guest interface device 14, the guest may translate the wearable visualization device 12 toward the guest interface device 14 to engage the devices together. In one embodiment, support ribs 94 may be provided on the guest interface device 14, such as on the interface frame 18, that engage with corresponding support grooves 98 of the wearable visualization device 12. The guest may translate the wearable visualization device 12 along the support ribs 94 as part of engaging the wearable visualization device 12 to the guest interface device 14, thereby bringing the respective primary magnets 80, 84 and/or secondary magnets 88, into proximity and alignment. In this manner, the primary magnets 80, 84 and/or the secondary magnets 88, 90 may align with and magnetically couple to their respective counterparts.

Moreover, at least a portion of the wearable visualization device 12 may be configured to translate with respect to the structure of the guest interface device 14 so as to enable the primary magnets 80 to align with and magnetically couple to the counterpart primary magnets 84 of the guest interface device 14. To this end, the mechanical engagement between the support ribs 94 and the support grooves 98 may support substantially all of a weight of the wearable visualization device 12 (e.g., when coupled to the guest interface device 14), while the magnetic engagement between the primary magnets 84 and the secondary magnets 88, 90 helps prevent the wearable visualization device 12 from disengaging (e.g., sliding off of) the guest interface device 14. Indeed, it should be understood that a force utilized to magnetically decouple the primary magnets 80, 84 and to magnetically decouple the secondary magnets 88, 90, such as when transitioning the wearable visualization device 12 from the engaged configuration to the detached configuration, may be greater than, for example, a force acting on the wearable visualization device 12 due to gravity, due to shaking or turning of the guest's head, or due to other inadvertent contact with the wearable visualization device 12. Accordingly, the magnets 80, 84, 88, 90, in conjunction with the support ribs 94 and the support grooves 98, may be configured to retain the wearable visualization device 12 in the engaged configuration on the guest interface device 14 until the guest manually removes the wearable visualization device 12 from the guest interface device 14. In other embodiments, the coupling may be achieved with other structural features besides or in addition to magnets, such as snap-on extensions, user-releasable latches, and so forth.

To remove the wearable visualization device 12 from the guest interface device 14, the guest may translate the wearable visualization device 12 away from the guest interface device 14 so as to cause the primary magnets 80, 84 and/or the secondary magnets 88, 90 to magnetically decouple. The guest may continue to translate the wearable visualization device 12 away from the guest interface device 14 to remove (e.g., decouple) the wearable visualization device 12 from the guest interface device 14, thereby retaining the guest's ability to perceive 3-D content through the lenses 52. In other embodiments, the guest may release structural latches or disengage snap-on extensions to facilitate the removal of the wearable visualization device 12 from the guest interface device 14.

It should be appreciated that, in certain embodiments, one of the wearable visualization device primary magnets 80 or the guest interface device primary magnets 84 may be replaced with a suitable reaction material (e.g., metallic plates). Similarly, one of the wearable visualization device secondary magnets 88 or the guest interface device secondary magnets 90 may be replaced with such a reaction material. As such, in these embodiments the primary magnets 80 and/or 84 or secondary magnets 88 or 90 may be configured to attract a corresponding reaction material instead of another magnet.

Moreover, in certain embodiments, any of the magnets 80, 84, 88, and/or 90 may be replaced with suitable electromagnets that are powered via a wired or wireless power source (e.g., a battery). In such cases, the electromagnets may be deactivated to enable separation of the wearable visualization device 12 from the guest interface device 14 at certain times, such as during an unloading process in which the guest is unloading from the ride vehicle of the amusement park ride. Similarly, the electromagnets may be activated to facilitate securement of the wearable visualization device 12 to the guest interface device 14 at certain times, such as during a loading process in which the guest is loading onto the ride vehicle of the amusement park ride.

By enabling guests to fit or remove the wearable visualization device 12 on the guest interface device 14, instead of attaching the wearable visualization device 12 directly to the head of the guest, direct, physical contact between the wearable visualization device 12 and the guest's head may be substantially avoided. Further, as discussed herein, because the guest interface device is provided with lenses 52 (or other 3-D visualization structures), the guest interface device 14, when worn without the wearable visualization device 12, can be used to view 3-D images 36 projected or displayed as part of an attraction. As noted herein, however, the 3-D content viewable using the guest interface device 14 may also be viewable when the wearable visualization device 12 is coupled to the guest interface device 14 in AR contexts where the wearable visualization device 12 allows viewing of such external content.

Figure 4:
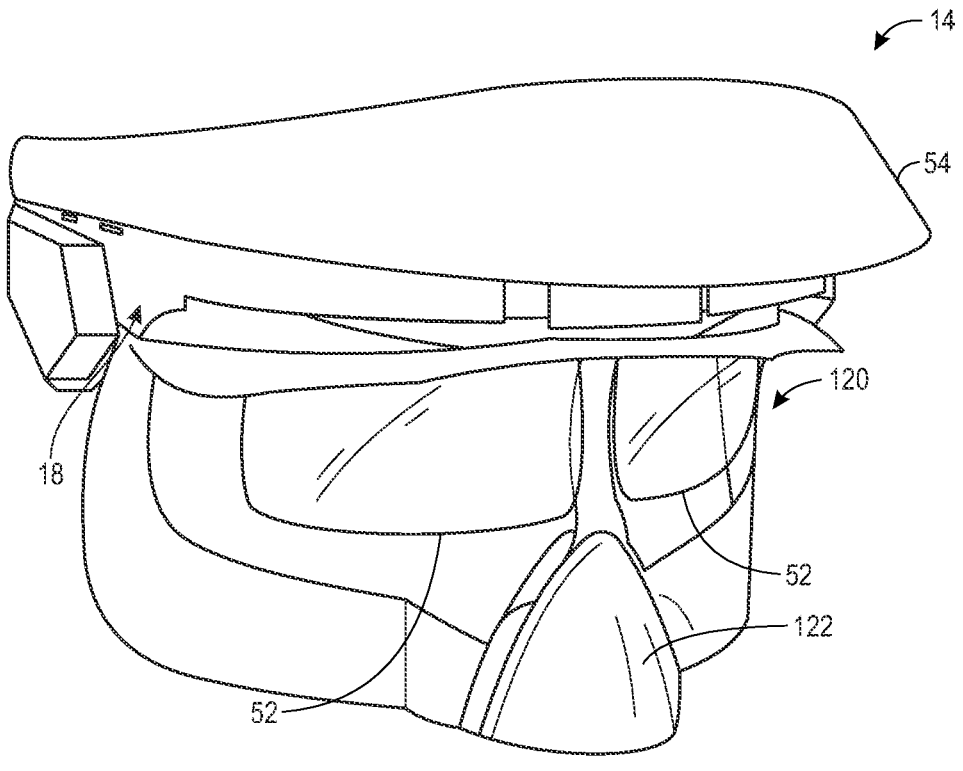
FIG. 4 is a perspective view of an embodiment of a guest interface device including a facemask portion and lenses for viewing 3-D content, in accordance with present embodi-ments.
Figure 5:
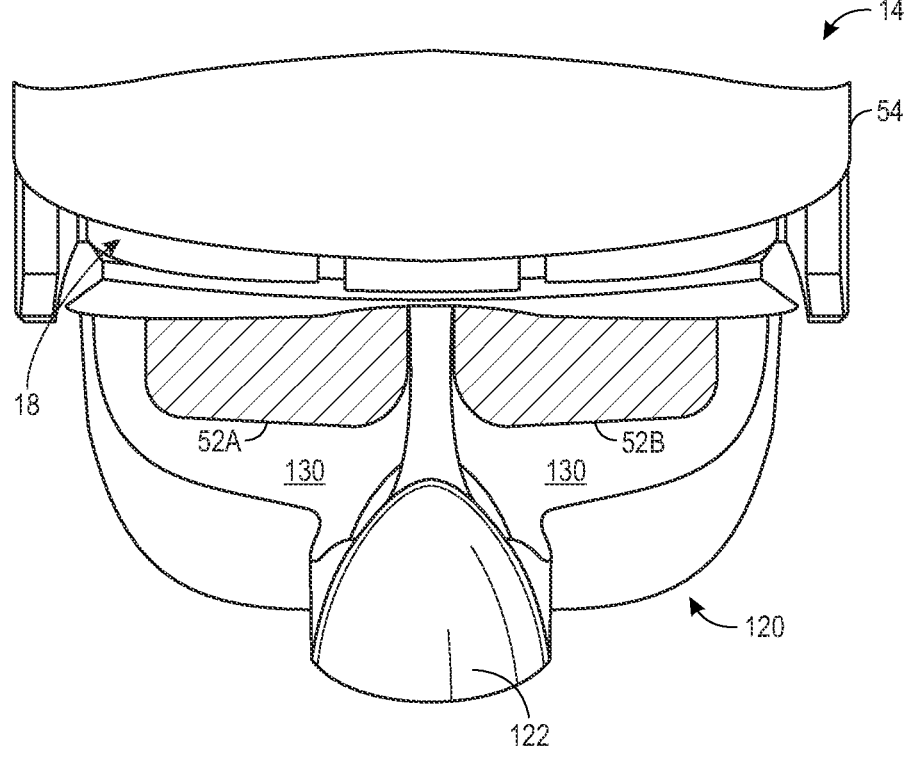
FIG. 5 is a front view of an embodiment of a guest interface device including a facemask portion and lenses for viewing 3-D content, in accordance with present embodi-ments.
Figure 6:
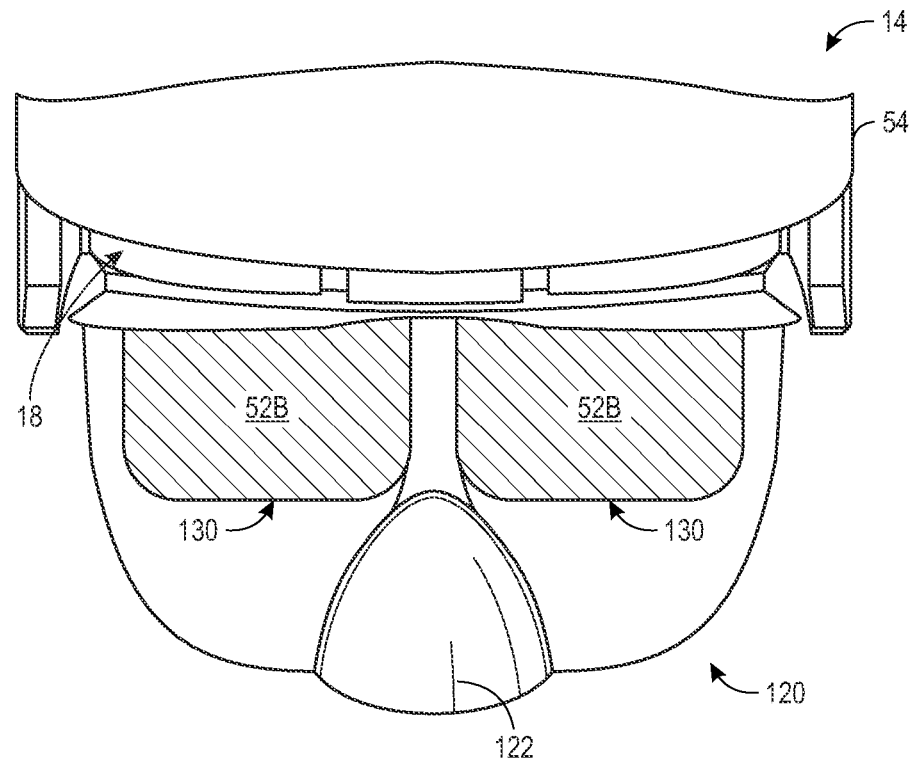
FIG. 6 is a front view of another embodiment of a guest interface device including a facemask portion and lenses for viewing 3-D content, in accordance with present embodiments.

With respect to the guest interface device 14 and the respective 3-D viewing optics (e.g., lenses 52), further examples illustrating various embodiments and configurations are shown in FIGS. 4-6. Turning to FIG. 4, an embodiment of the guest interface device 14 is depicted as including 3-D viewing optics, as discussed herein, in the form of lenses 52 provided as part of or attached to the guest interface device 14. In the depicted example, the guest interface device 14 includes a facemask portion 120 (including a nose guard 122) configured to fit to a face of a guest wearing the guest interface device. Such a facemask portion 120 may help in positioning and/or aligning the guest interface device 14 to the face of the guest. In practice, guest interface devices (and corresponding facemask portions) may be provided in different sizes to accommodate differences in guest size and anatomy.

Turning to FIGS. 5 and 6, two alternative styles for the facemask portion 120 are illustrated. In both examples, the respective lenses 52 are illustrated as having different polarization (e.g., perpendicular polarization, opposite polarization) for a respective left lens 52A and a right lens 52B so as to facilitate viewing of 3-D images 36 using the guest interface device 14. Such differing polarization may be achieved using passive or active polarization techniques, as discussed herein. In the example of FIG. 5, the respective lenses 52 are depicted as having a limited extent with respect to openings 130 of the facemask portion 120, leaving open space for the flow of air while still providing 3-D viewing capability to a wearer of the guest interface device 14. Conversely, in FIG. 6 the depicted example of the guest interface device 14 includes respective lenses 52 that substantially or completely fill the openings 130, which may be useful to create a more immersive experience or otherwise provide a greater range of vision capable of viewing 3-D content using the guest interface device 14.

Figure 7:
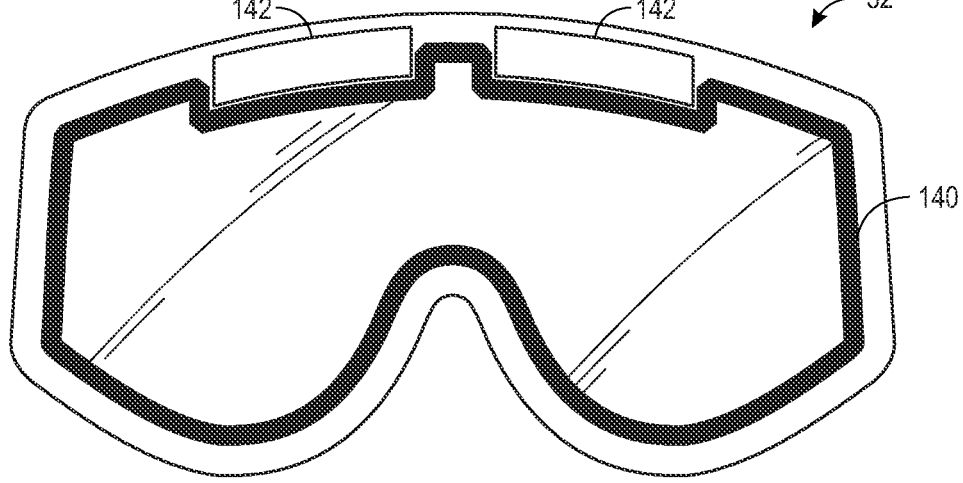
FIG. 7 is a front view of an embodiment of a single piece lens assembly capable of being removable attached to a guest interface device, in accordance with present embodiments.

In some embodiments, the lenses 52 may be removable or otherwise separable from the remainder of the guest interface device 14. An example of one such separable lenses piece is illustrated in FIG. 7, where separate lenses 52 are illustrated in the form of a detachable visor. As may be appreciated, though the lenses 52 are provided as a single visor in this example, differing polarization, liquid crystal layers, or anaglyph colors may still be present on the two halves of the visor to facilitate viewing of 3-D images 36. That is, in such embodiments, the lenses 52 may be formed from a single, continuous piece of material, where a first lens region having a first optical property may be aligned with a first eye (e.g., left eye) of the guest and a second lens region having a different, second optical property may be aligned with a second eye (e.g., right eye) of the guest. In other embodiments, the lenses 52 may be a lens assembly of multi-piece construction that is formed from two or more separate lenses coupled together.

In this example the lenses 52 may fasten to the guest interface device 14 via one or more magnetic structures 142 (e.g., a magnet or metal plate), a clip-on or other mechanical fastener structure, or alternatively, may slide into a slot or groove structure provided in the facemask portion 120 of a guest interface device 14. In this manner, different lenses 52 may be replaced or exchanged on demand with respect to a guest interface device 14 and vice versa. Indeed, such replicability may facilitate efficient cleaning of the lenses 52 and/or user-selection of lenses 52 that are specific to user qualities (e.g., adult, child, prescription glasses wearer).

In the depicted example, a raised spacer 140 is also shown as being provided on an environment-facing surface of the lenses 52. Such a spacer 140 may be formed from a foam material, a rubber material, a plastic material, or other suitable material. When present, the spacer 140 may help maintain a spaced or pre-determined distance between the surface of the lenses 52 and facing surfaces of the wearable visualization device 12, thereby desirably blocking contact therebetween. It should be understood that the spacer 140 may take any suitable form, such as one in which spacer material is concentrated or provided mainly at lateral edge portions of the lenses 52 (e.g., regions of expected or likely contact).

With the preceding in mind, in operation, the guest (e.g., user) may be provided with a dedicated guest interface device 14 (e.g., upon entry into the amusement park and/or while waiting in line for the amusement park attraction) that may be worn by that particular guest for a period of time, such as throughout the amusement park (e.g., in multiple different attractions of the amusement park) or throughout the duration of the amusement park attraction (e.g., on a single ride). For example, prior to boarding the attraction, the guest may fit the guest interface device 14 on the guest's head in accordance with the techniques discussed above. While boarding the attraction, the guest may couple the wearable visualization device 12 to the guest interface device 14. In this manner, the guest may enjoy the experience provided by the attraction including AR/VR content as well as projected or displayed 3-D content, where available.

When deboarding the attraction, the guest may decouple the wearable visualization device 12 from the guest interface device 14. In some cases, upon deboarding the attraction, the guest may then discard of the guest interface device 14 at an appropriate location (e.g., a collection bin). Alternatively, as noted above, the guest may wear the guest interface device 14 on multiple different rides or during multiple different attractions. For example, the guest may carry the guest interface device 14 from ride to ride, and connect the guest interface device 14 to the wearable visualization device 12 of each ride vehicle of each ride to enjoy a unique AR/VR experience for each ride. In such implementations, and as discussed herein, the guest while wearing the guest interface device 14 may continue to view 3-D content (e.g., 3-D images 36) provided for viewing as part of the attraction(s) prior to and subsequent to removal of the wearable visualization device 12 (or while wearing the wearable visualization device 12 in an AR context).

Figure 8:
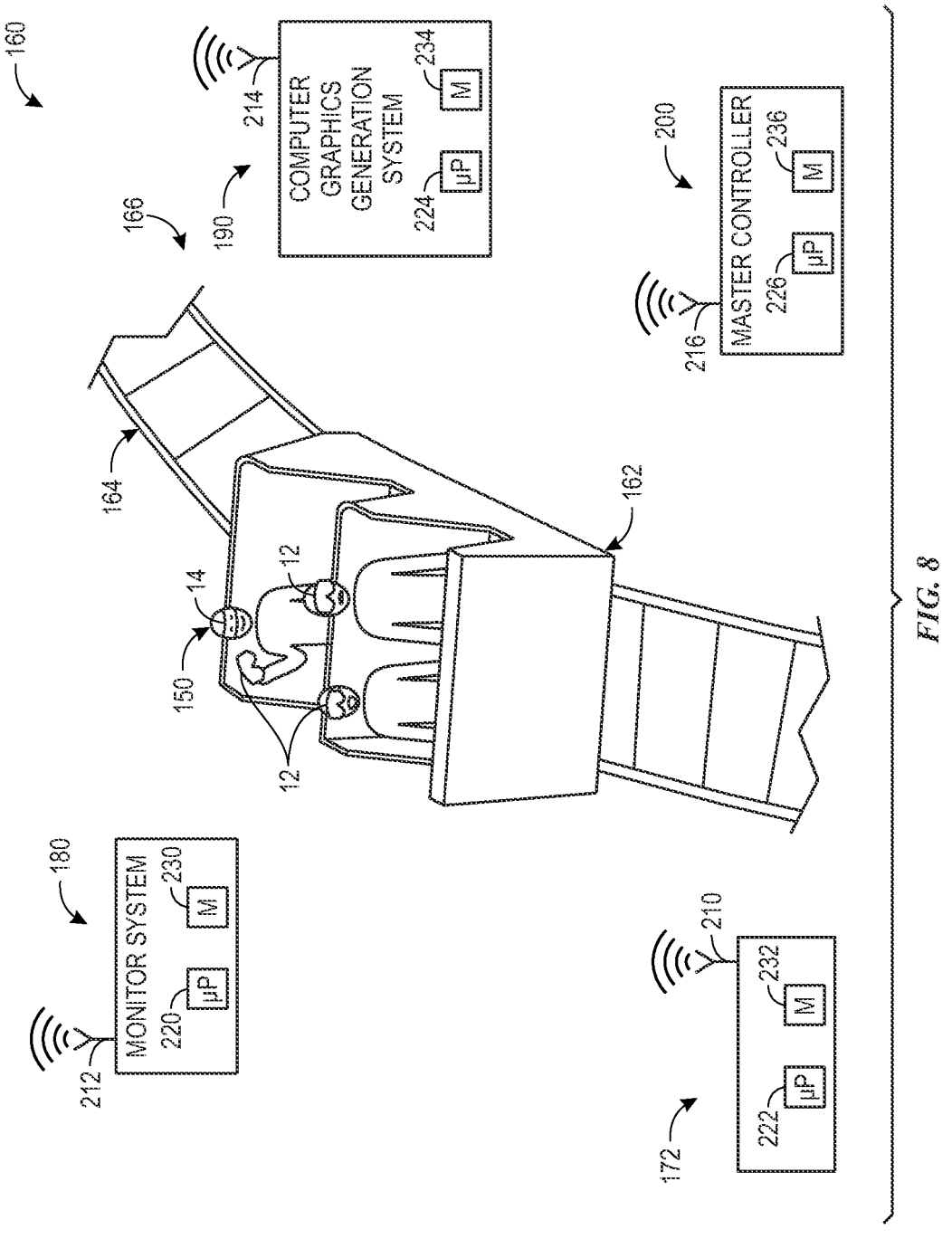
FIG. 8 is an illustration of the use of a guest interface device and wearable visualization device for viewing AR/VR content and 3-D content shown in use in the context of a passenger ride or attraction, in accordance with present embodiments.

By way of an example of a ride-based implementation involving 3-D content and virtual content, FIG. 8 illustrates three guests 150 within an amusement park 160, two of whom are wearing wearable visualization devices 12, such as coupled to respective guest interface devices 14, and a third who has not coupled the wearable visualization devices 12 to his or her respective guest interface devices 14. As discussed herein, each of the wearable visualization devices 12 includes one of or more displays suitable for displaying virtual features 32 in either an AR or VR context. The guest interface device 14, as shown in the preceding figures and examples, includes lenses 52 or other optical features suitable for viewing 3-D images.

In depicted example, the guests 150 are in a passenger ride vehicle 162 that is moveable along a ride path 164 (e.g., tracks) of a thrill ride 166, such as a rollercoaster or dark ride. In the illustrated embodiment, the ride path 164 may be provided through a surrounding physical environment within view of additional amusement attractions (e.g., Ferris wheel), a mall of park facilities (e.g., game areas, hotels, restaurants, souvenir shops), and other elements of the physical environment. However, it should be understood that the ride path 164 may be omitted and the thrill ride 166 may be a generally stationary ride or attraction, in some embodiments.

A 3-D display (e.g., electronic display device 172) may be provided in view of the ride vehicle 162 and disposed within the physical environment so as to be viewable from the ride path 164. That is, the electronic display devices 172 are visible from the passenger ride vehicle 162 during all or part of a ride. Additionally, it is to be understood that, in some embodiments, a projector screen and projector may be employed in addition to or as an alternative to the electronic display devices 172 to present 3-D images 36 to the guests 150.

By including one or more such electronic display devices 172 (or 3-D projectors), a guest 150 wearing a guest interface device 14 may be able to perceive the displayed 3-D images 36 throughout a partial or full duration of the thrill ride. For example, in an AR context, the guests 150 may be able to perceive the 3-D images 36 displayed on the electronic display devices 172 when both the guest interface device 14 and the wearable visualization device 12 are worn. In a VR context, the guests 150 may be able to perceive the 3-D images 36 displayed on the electronic display devices 172 when the guest interface device 14 is worn and the wearable visualization device 12 is uncoupled, such as during boarding and/or deboarding.

With respect to other aspects of a content display system illustrated in FIG. 8, a monitoring system 180 may be communicatively coupled to a computer graphics generation system 190 and may be used to identify any suitable position, location, orientation, and so forth of the guest 150 (or multiple guests). In certain embodiments, the monitoring system 180 (e.g., one or more cameras) may be employed to determine whether guests 150 are currently wearing the wearable visualization device 12 (such as for viewing VR content, e.g., virtual features 32) coupled to the guest interface device 14 (for viewing 3-D images 36). Such information may be leveraged to determine whether display or projection of 3-D images 36 may be suspended, such as if all guests in position to view a 3-D image 36 are wearing a wearable visualization device 12 in the form of a VR headset, and thus unable to see the 3-D images 36. Conversely, if at least one guest 150 is determined to not have the wearable visualization device 12 coupled to their guest interface device 14, the 3-D images 36 may continue to be displayed since at least one guest may be capable of seeing such images. Indeed, such embodiments may conserve power and increase operating efficiency by conserving display of the 3-D images 36 to instances when guests are able to see them. In further embodiments, if less than a threshold number of guests are wearing the wearable visualization devices 12 and/or if a prompt has already been given, the 3-D images 36 may provide further prompts to encourage coupling of the wearable visualization devices 12.

The 3-D viewing system (e.g., electronic display devices 172) may be communicatively coupled to the monitoring system 180, a computer graphics generation system 190, and a master controller 200 along a wireless network. The wireless network may include a wireless local area network (WLAN), a wireless wide area network (WWAN), a near field communication (NFC), a mesh-type network, and so forth. Indeed, in embodiments of the wireless network having the mesh-type network, the various displayable content discussed herein may be reflexively or automatically localized for a current state or condition of the AR/VR and electronic display devices 172 and/or the guests 150. In the present embodiment, the wireless network communicatively couples each component of the AR/VR and the 3-D viewing system (e.g., electronic display devices 172), though in other embodiments, one or multiple components of the AR/VR and the 3-D viewing system may be communicatively coupled by a wired connection. Accordingly, the monitoring system 180, the electronic display devices 172, the computer graphics generation system 190, and the master controller 200 each include respective communication features 210,

212, 214, 216 that enable the 3-D display system (e.g., electronic display devices 172), the monitoring system 180, the computer graphics generation system 190, and the master controller 200 to transfer data and/or control signals via the wireless network. In addition, as shown in FIG. 8, each of the monitoring system 180, the electronic display devices 172, the computer graphics generation system 190, and the master controller 200 may incorporate respective processing components 220, 222, 224, and 226 and memory components 230, 232, 234, and 236 used in combination to execute routines or other executable code to provide the respective functionality of these devices and systems.

In certain embodiments, the computer graphics generation system 190 of the AR/VR and the 3-D viewing system is responsible for generating the AR/VR imagery (e.g., virtual features 32) to be presented to the guest(s) 150 via the wearable visualization device 12 and the 3-D images 36 viewable by the guest(s) 150 wearing the guest interface device 14. For example, the computer graphics generation system 190 of a present embodiment is a server or game controller that is positioned within an amusement park to generate the AR/VR content (e.g., virtual features 32) based on various factors associated with the guest(s) 150. As such, the computer graphics generation system 190 is generally a system having significant processing power that renders the AR/VR and/or 3-D content based on specific inputs received via the wireless network or a wired network. For example, in some embodiments, the computer graphics generation system 190 processes real-time video data (e.g., live video), orientation and position data, point of view data, or any combination thereof, received from the wearable visualization device 12 and/or the monitoring system 180.

By way of example, in an AR context, the computer graphics generation system 190 may use this data to generate a frame of reference to register the AR images (e.g., virtual features 32) to the physical environment, for example, to the real-world environment 30 and/or the 3-D images 36 viewable by the guest 150 through the guest interface device 14. Using the frame of reference generated based on the orientation data, position data, point of view data, motion tracking data, and so forth, the computer graphics generation system 190 may then render a view of the AR images in a manner that is temporally and spatially commensurate with what the guest 150 would perceive without the wearable visualization device 12. The computer graphics generation system 190 may constantly update (e.g., in real-time) the rendering of the AR images (e.g., virtual features 32) to reflect change in respective orientation, position, and/or motion of the respective guest 150. Moreover, some embodiments of the computer graphics generation system 190 may update the 3-D images 36 based on the present virtual features, actions of the guests 150, and so forth.

Conversely, in a VR context, the computer graphics generation system 190 may use this data to cause the display of virtual features in perceived locations or orientations that prevent a guest 150 from inadvertently interacting with real-world structures or features, including other guests 150. Using the frame of reference generated based on the orientation data, position data, point of view data, motion tracking data, and so forth, the computer graphics generation system 190 may then render a view of the virtual features 32 in a manner that is temporally and spatially commensurate with what the guest 150 is supposed to perceive and in positions and orientations that do not risk accidental contact with real-world objects. The computer graphics generation system 190 may constantly update (e.g., in real-time) the rendering of the virtual features 32 to reflect change in respective orientation, position, and/or motion of the respective guest 150.

The master controller 200 (e.g., show controller, amusement park controller) of the present embodiment of the AR/VR and 3-D viewing system coordinates operation of the components of the AR/VR and 3-D viewing systems disclosed herein. For example, the master controller 200 provides control signals via the wireless network to the computer graphics generation system 190, the 3-D display system (e.g., electronic display devices 172), and the wearable visualization device 12 in embodiments in which the wearable visualization device include wireless communication circuitry. Generally, the master controller 200 of the present embodiment instructs the computer graphics generation system 190 to generate and provide the virtual features 32 to the wearable visualization device 12. In some embodiments, the master controller 200 instructs the computer graphics generation system 190 to generate and provide the 3-D images 36 to the 3-D display system (e.g., electronic display devices 172). Moreover, the master controller instructs the wearable visualization device 12 to present the virtual features 32 to the guest 150 and instructs the electronic display devices 172 to present the 3-D images 36 to the guests 150, each in a controlled, contextualized, and/or individualized manner.

Figure 9:
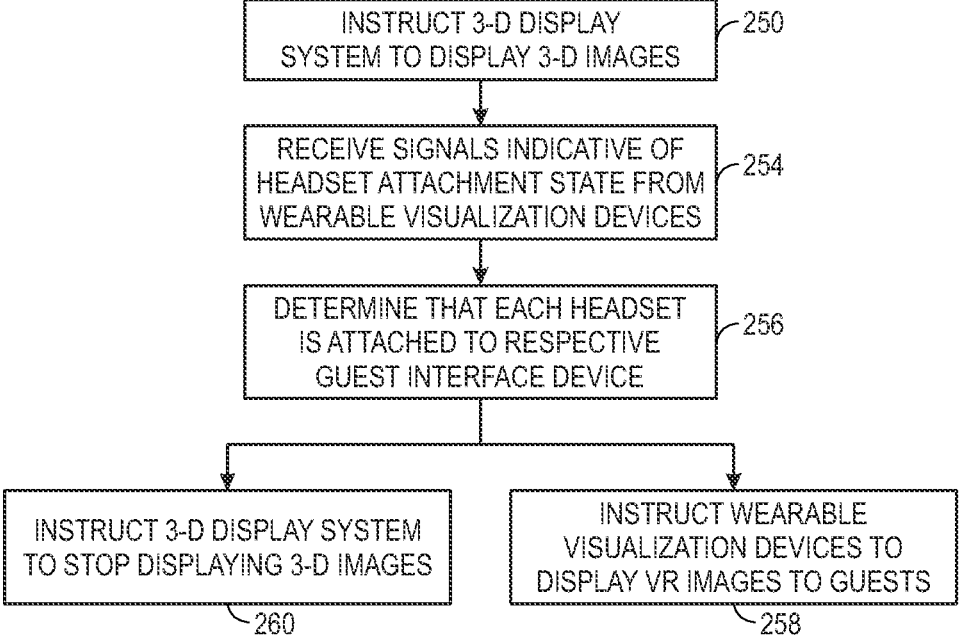
FIG. 9 is a flowchart illustrating an embodiment of a process of operating an AR/VR and 3-D viewing system, in accordance with present embodiments.

With the preceding in mind, FIG. 9 depicts an example of a process flow diagram of an embodiment of a process to provide AR/VR and 3-D enhancements to amusement park guests 150. The process may be useful in creating and displaying VR content and a 3-D experience during an amusement park experience, such as a thrill ride or other attraction. The process may be representative of executed code or instructions stored in a non-transitory computer-readable medium (e.g., one or more of the memory 230, 232, 234, 236) and executed, for example, by a processor of a wearable visualization device 12, the processor 224 of the computer graphics generation system 190, the processor 222 of the electronic display devices 172, and/or the processor 226 of the master controller 200. The processors 222, 224, 226 may be communicatively coupled via a network, such as the wireless network, to receive and send the instructions described below.

In particular, the depicted process may be useful in a context where VR content is displayed during a portion of the attraction and 3-D content is displayed for a different portion of the attraction (i.e., the display of VR and 3-D content do not overlap). In other contexts where the virtual features are present in an AR format, the decision points and/or actions, though similar, may differ based on the AR context, such as instructing the wearable visualization device 12 to display AR images when it is determined that the wearable visualization device 12 is attached to a guest interface device 14 while continuing to display 3-D content.

Turning to the illustrated example of the process, the process may begin by instructing (step 250) the 3-D display system, which may encompass electronic display devices 172, to display 3-D images 36. These 3-D images 36 may be viewed by guests 150 wearing guest interface devices 14, as discussed herein, equipped with 3-D viewing optics (e.g., lenses 52). In the depicted example, a determination (step 256) may then be made, such as based upon signals received (step 254) from a monitoring system 180, that some or all guests 150 participating in an attraction have attached their respective wearable visualization devices 12 to their guest interface devices 14. By way of example, this may occur at set portions of the ride or attraction, such as based upon prompts provided to the guests 150 (e.g., via the electronic display devices 172). In this manner, the guests 150 may enjoy 3-D images 36 for a portion of the attraction (or prior to the attraction) and, when prompted, may equip a VR headset so as to enjoy VR content for other portions of the attraction or ride.

Upon determining at step 256 that the wearable visualization devices 12 of the monitored guests are attached to their respective guest interface devices 14, the wearable visualization devices 12 may be instructed (step 258), either individually or collectively, to display VR content (e.g., virtual features 32) to the guests 150. As discussed above, the computer graphics generation system 190 generates the virtual features 32, although in other embodiments, the virtual features 32 may be generated by a processor of the wearable visualization device 12 or the processor 226 of the master controller 200. In some embodiments, the virtual features 32 generated by the computer graphics generation system 190 are individualized or customized for the guest 150. For example, based on a group associated with the guest 150, a position of the guest 150 along the ride path 164, an orientation of the guest 150, or any other suitable sensor data related to the guest 150, the computer graphics generation system 190 generates the virtual features 32 specifically for individualized display to the guest 150, in some embodiments. During or after generation of the virtual features 32, the computer graphics generation system 190 transmits the virtual features 32 to the wearable visualization device 12 via the wireless network.

In the depicted example, if a determination is made at step 256 that all monitored guests 150 in a respective group or region of the attraction are viewing VR content, the electronic display devices 172 or projector may be instructed (step 260) to cease displaying 3-D images 36. In this manner, the display or presentation of content that is not being viewed by any guest 150 can be limited or eliminated to conserve processing power and improve operating efficiency. Conversely, upon receiving an indication that a guest 150 is in the line of view of an electronic display device 172 and is not wearing a wearable visualization device 12, display of the 3-D images can be resumed or restarted. Moreover, certain embodiments may present a prompt via the electronic display device 172 to instruct the guest 150 to reattach their wearable visualization device 12.

As set forth above, embodiments of the present disclosure may provide one or more technical effects useful for incorporating 3-D viewing capability to a head-worn device (e.g., an interface device) to which another device may be coupled to provide VR or AR functionality. The device providing VR or AR viewing functionality may be removably coupled to the interface component providing 3-D viewing functionality. In this manner and as recognized herein, a guest of an amusement park may view 3-D content when the AR or VR functionality is removed, while still being able to view the AR or VR content by attaching the device (e.g., VR headset or electronic eyeglasses) when desired or prompted.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A combined three-dimensional (3-D) and virtual reality (VR), augmented reality, and/or mixed reality viewing system, comprising:
   an interface device comprising:
      a head strap assembly configured to be worn on a head of a user to secure the interface device to the head;
      an interface frame coupled to the head strap assembly;
      a 3-D viewing component coupled to the interface frame to form a 3-D viewing assembly, wherein the 3-D viewing component is configured to allow viewing of one or more coded two-dimensional (2-D) images as one or more deciphered 3-D features; and
      an attachment mechanism configured to removably couple a wearable visualization device to the 3-D viewing assembly; and
   the wearable visualization device configured to be tethered to a ride vehicle, wherein the wearable visualization device comprises one or more displays and is configured to encompass an entire view of the user.

2. The viewing system of claim 1, wherein the 3-D viewing component comprises a first lens having a first polarization and a second lens having a second polarization, different than the first polarization, and the one or more displays of the wearable visualization device, when coupled to the attachment mechanism, comprise a corresponding first lens and a corresponding second lens having matching polarization with the first lens and the second lens respectively.

3. The viewing system of claim 1, comprising:
   a processing system comprising one or more processors; and
   a non-transitory computer-readable medium comprising processor-executable instructions executable by the processing system to cause the processing system to perform operations comprising:
      determining whether the wearable visualization device is coupled to the 3-D viewing assembly; and
      in response to determining that the wearable visualization device is coupled to the 3-D viewing assembly, instructing the wearable visualization device to display a VR environment on the one or more displays to enable the user to view the VR environment on the one or more displays through lenses of the 3-D viewing component.

4. The viewing system of claim 1, wherein the one or more displays are opaque.

5. The viewing system of claim 1, wherein the 3-D viewing component comprises a first anaglyph lens and a second anaglyph lens of a different color from the first anaglyph lens.

6. The viewing system of claim 1, wherein the 3-D viewing component comprises active shuttering lenses comprising a first liquid crystal layer and a second liquid crystal layer, the first liquid crystal layer is configured to be opaque in response to application of power to the active shuttering lenses, and the second liquid crystal layer is configured to be translucent in response to the application of power to the active shuttering lenses.

7. The viewing system of claim 1, wherein the attachment mechanism comprises one or more electromagnets config-ured to be selectively activated to magnetically engage corresponding magnets or metallic attachment structures provided on the wearable visualization device.

8. The interface device of claim 1, wherein the attachment mechanism comprises a plurality of attachment structures, and the wearable visualization device is configured to removably couple to a first side of the 3-D viewing assembly via a first attachment structure of the plurality of attachment structures, and the wearable visualization device is config-ured to removably couple to a second side of the 3-D viewing assembly via a second attachment structure of the plurality of attachment structures.

9. The viewing system of claim 1, wherein the wearable visualization device is configured to be tethered to the ride vehicle via a cable that electronically couples the wearable visualization device to a computer graphics generation sys-tem that generates a VR environment for display on the one or more displays.

10. A combined three-dimensional (3-D) and virtual real-ity, augmented reality, and/or mixed reality viewing system, comprising:

a 3-D display device comprising a projector or an elec-tronic display device, wherein the 3-D display device is configured to project or display 3-D images on a display surface in a physical environment;

a wearable visualization device comprising one or more displays and configured to encompass an entire view of a user, wherein the wearable visualization device is distinct from the 3-D display device and the one or more displays are physically separate from the display surface in the physical environment; and an interface device configured to be worn on a head of a user, the interface device comprising:

a 3-D viewing assembly comprising an interface frame and a 3-D viewing component coupled to the inter-face frame, wherein the 3-D viewing component is configured to allow viewing of the projected or displayed 3-D images on the display surface in the physical environment; and an attachment mechanism configured to removably couple the wearable visualization device to the 3-D viewing assembly.

11. The viewing system of claim 10, comprising:

a processing system comprising one or more processors; and a non-transitory computer-readable medium comprising processor-executable instructions executable by the processing system to cause the processing system to perform operations comprising:

instructing the projector or the electronic display device to project or display the projected or displayed 3-D images.

12. The viewing system of claim 11, wherein the projected or displayed 3-D images comprise a prompt to couple the wearable visualization device to the 3-D viewing assembly.

13. The viewing system of claim 10, comprising:

a processing system comprising one or more processors; and a non-transitory computer-readable medium comprising processor-executable instructions-executable by the processing system to cause the processing system to perform operations comprising:

determining whether the wearable visualization device is coupled to the 3-D viewing assembly; and instructing the wearable visualization device to display a virtual environment on the one or more displays in response to determining that the wearable visualiza-tion device is coupled to the 3-D viewing assembly.

14. The viewing system of claim 13, wherein the opera-tions comprise instructing the projector or the electronic display device to display the projected or displayed 3-D images in response to determining that the wearable visu-alization device is not coupled to the 3-D viewing assembly.

15. A combined three-dimensional (3-D) and virtual real-ity (VR), augmented reality, and/or mixed reality viewing system, comprising:

a 3-D display device comprising a projector or an elec-tronic display device, wherein the 3-D display device is configured to project or display 3-D images on a display surface in a physical environment;

a plurality of wearable visualization devices distinct from the 3-D display device, wherein each wearable visual-ization device of the plurality of wearable visualization devices comprises one or more displays and is config-ured to encompass an entire view of a user, and the one or more displays are physically separate from the display surface in the physical environment;

a plurality of interface devices, wherein each interface device of the plurality of interface devices comprises:

an interface frame configured to be worn on a head of the user;

a 3-D viewing component coupled to the interface frame to form a 3-D viewing assembly, wherein the 3-D viewing component is configured to allow view-ing of the projected or displayed 3-D images on the display surface in the physical environment; and an attachment mechanism configured to removably couple a wearable visualization device of the plural-ity of wearable visualization devices to the 3-D viewing assembly.

16. The viewing system of claim 15, comprising:

a processing system comprising one or more processors; and a non-transitory computer-readable medium comprising processor-executable instructions executable by the processing system to cause the processing system to perform operations comprising:

determining whether at least one wearable visualization device of the plurality of wearable visualization devices is coupled to at least one corresponding interface device of the plurality of interface devices; and instructing the at least one wearable visualization device to display a VR environment on the one or more displays of the at least one wearable visualiza-tion device in response to determining that the at least one wearable visualization device is coupled to the at least one corresponding interface device.

17. The viewing system of claim 16, wherein the opera-tions comprise instructing the projector or the electronic display device to display the projected or displayed 3-D images in response to determining that the at least one wearable visualization device of the plurality of wearable visualization devices is not coupled to the at least one corresponding interface device.

18. The viewing system of claim 17, wherein the opera-tions comprise instructing the projector or the electronic display device to stop display of the projected or displayed 3-D images in response to determining that the at least one wearable visualization device of the plurality of wearable visualization devices is coupled to the at least one corresponding interface device.

19. The viewing system of claim 15, wherein each wearable visualization device of the plurality of wearable visualization devices is configured to display a VR environment based on a position of a respective user relative to a ride path of a ride.

20. The viewing system of claim 19, wherein each wearable visualization device of the plurality of wearable visualization devices is tethered to a ride vehicle configured to travel along the ride path of the ride.

\* \* \* \* \*